US012111588B2

(12) United States Patent
Harada et al.

(10) Patent No.: US 12,111,588 B2
(45) Date of Patent: Oct. 8, 2024

(54) IMAGE-FORMING APPARATUS TO CONTROL INTERMEDIATE TRANSFER BELT DRIVING SPEED

(71) Applicant: CANON KABUSHIKI KAISHA, Tokyo (JP)

(72) Inventors: Shingo Harada, Kanagawa (JP); Kosuke Ogino, Shizuoka (JP); Hiroyuki Kadowaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/177,677

(22) Filed: Mar. 2, 2023

(65) Prior Publication Data

US 2023/0324833 A1 Oct. 12, 2023

(30) Foreign Application Priority Data

Apr. 6, 2022 (JP) ................................ 2022-063360

(51) Int. Cl.

*G03G 15/16* (2006.01)
*G03G 15/00* (2006.01)
(Continued)

(52) U.S. Cl.

CPC ..... *G03G 15/1615* (2013.01); *G03G 15/5054* (2013.01); *G03G 15/5058* (2013.01);
(Continued)

(58) Field of Classification Search

CPC ........... G03G 15/0189; G03G 15/1615; G03G 15/5054; G03G 15/5058; G03G 21/20; G03G 2215/00059; G03G 2215/0122
(Continued)

(56) References Cited

U.S. PATENT DOCUMENTS

| | | | | |
|---|---|---|---|---|
| 6,226,465 B1 * | 5/2001 | Funatani | G03G 15/1605 | 399/302 |
| 2007/0172258 A1 * | 7/2007 | Matayoshi | G03G 15/5008 | 399/167 |

(Continued)

FOREIGN PATENT DOCUMENTS

| | | |
|---|---|---|
| JP | 2004054144 A | 2/2004 |
| JP | 2005121771 A | 5/2005 |

(Continued)

*Primary Examiner* — Robert B Beatty
(74) *Attorney, Agent, or Firm* — Canon U.S.A., Inc. IP Division

(57) ABSTRACT

An image-forming apparatus includes a photosensitive drum, a development member, an intermediate transfer belt, a transfer member, a transfer voltage, a density detection unit, a temperature detection unit, and a control unit. The development member forms a toner image on a surface of the photosensitive drum, which the transfer member transfers to the intermediate transfer belt. The density detection unit detects an information related to a density of the toner image transferred to the intermediate transfer belt. The control unit controls a driving speed of the intermediate transfer belt. In a detection operation in which the density detection unit detects the information related to the density of the toner image transferred to the intermediate transfer belt in a state where the transfer voltage is applied to the transfer member, the control unit controls the driving speed based on an ambient temperature detected by the temperature detection unit.

11 Claims, 10 Drawing Sheets

(51) Int. Cl.
*G03G 21/20* (2006.01)
*G03G 15/04* (2006.01)

(52) U.S. Cl.
CPC ....... *G03G 21/20* (2013.01); *G03G 15/04072* (2013.01); *G03G 15/1605* (2013.01); *G03G 15/1675* (2013.01); *G03G 15/5008* (2013.01); *G03G 15/5037* (2013.01); *G03G 15/5045* (2013.01); *G03G 15/553* (2013.01); *G03G 2215/00059* (2013.01)

(58) Field of Classification Search
USPC ............................... 399/44, 49, 66, 302, 308
See application file for complete search history.

(56) References Cited

U.S. PATENT DOCUMENTS

| | | | | |
|---|---|---|---|---|
| 2014/0064799 | A1* | 3/2014 | Naruse | G03G 15/5058 399/301 |
| 2014/0153940 | A1* | 6/2014 | Nakae | G03G 15/167 399/66 |
| 2015/0277317 | A1* | 10/2015 | Okabayashi | G03G 15/50 399/68 |
| 2018/0074451 | A1* | 3/2018 | Izaki | G03G 15/0283 |

FOREIGN PATENT DOCUMENTS

| | | | |
|---|---|---|---|
| JP | 2007286270 | A | 11/2007 |
| JP | 2014106508 | A | 6/2014 |

* cited by examiner

IMAGE-FORMING APPARATUS TO CONTROL INTERMEDIATE TRANSFER BELT DRIVING SPEED

BACKGROUND

Field

The present disclosure relates to an electrophotographic image-forming apparatus.

Description of the Related Art

Conventional image-forming apparatuses, such as copy machines and printers, using an electrophotographic method have been known. In the electrophotographic method, a toner image developed with a development agent (toner) is formed on a transfer material such as paper using the power of static electricity, and then a fixing device applies heat and pressure to the toner image to melt and fix the toner image as an output image on the transfer material. In recent years, electrophotographic image-forming apparatuses have advanced functions to support color printing and high speed output, and in order to support such advanced functions, a wide range of electrophotographic color image-forming apparatuses have adopted a configuration including an intermediate transfer member. For example, Japanese Patent Application Laid-Open No. 2007-286270 discusses an electrophotographic color image-forming apparatus including an intermediate transfer member.

Meanwhile, some conventional color image-forming apparatuses have a function (hereinafter referred to as a calibration) of correcting color shifts and densities to achieve high image quality. The calibration function is to measure the reaching timing and density of a toner image formed on an intermediate transfer member using an image density sensor and correct image defects such as color shift and density deviation based on results of the measurement.

In a color image-forming apparatus including an intermediate transfer member such as that discussed in Japanese Patent Application Laid-Open No. 2007-286270, the intermediate transfer member sometimes has a high resistance value in a case where the intermediate transfer member is used for a long time or in a low-temperature, low-humidity environment. This can cause an abnormal discharge between a transfer member and a photosensitive drum when a transfer voltage is applied to the transfer member. Performing the calibration in such a situation can fail to obtain highly accurate calibration results.

SUMMARY

The present disclosure is directed to suppressing occurrence of image defects caused by occurrence of an abnormal discharge during calibration.

According to an aspect of the present disclosure, an image-forming apparatus to form an image on a recording material includes a photosensitive drum configured to rotate, an exposure unit including a light source and configured to expose the photosensitive drum with light from the light source and form an electrostatic latent image on a surface of the photosensitive drum, a development member configured to develop the electrostatic latent image formed on the photosensitive drum with toner and form a toner image on the surface of the photosensitive drum, an intermediate transfer belt to which the toner image formed on the photosensitive drum is to be transferred, a transfer member configured to transfer the toner image to the intermediate transfer belt, a transfer voltage application unit configured to apply a transfer voltage to the transfer member, a density detection unit configured to detect an information related to a density of the toner image transferred to the intermediate transfer belt, a temperature detection unit configured to detect an ambient temperature, and a control unit configured to control a driving speed of the intermediate transfer belt, wherein in a detection operation in which the density detection unit detects the information related to the density of the toner image transferred to the intermediate transfer belt in a state where the transfer voltage is applied to the transfer member, the control unit controls the driving speed based on the ambient temperature detected by the temperature detection unit.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the drawings.

[Configuration of Image-Forming Apparatus]

An entire configuration of an electrophotographic image-forming apparatus to which an exemplary embodiment of the present disclosure is applied will be described first.

Figure 1:
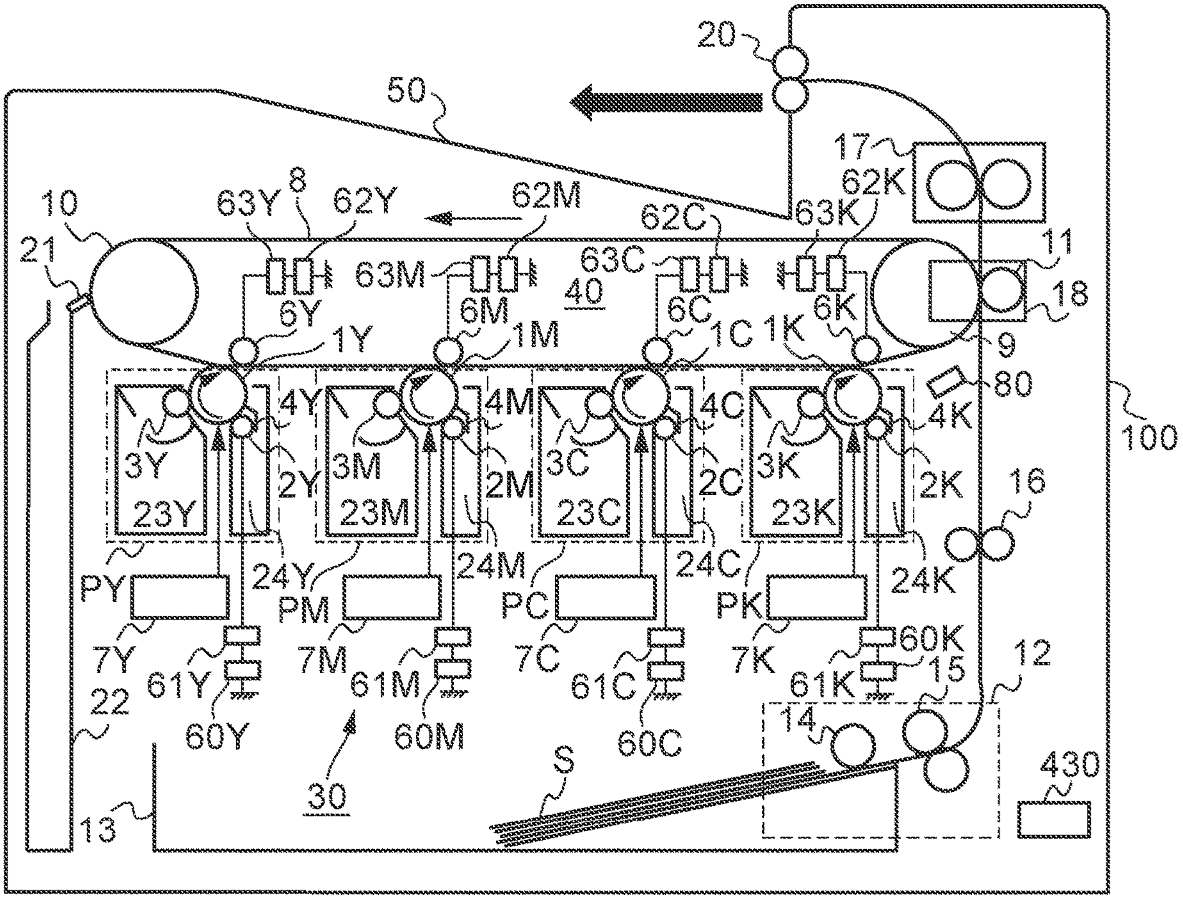
FIG. 1 is a cross-sectional view illustrating a configuration of an image-forming apparatus according to first to third exemplary embodiments.

FIG. 1 is a schematic cross-sectional view illustrating a configuration of an image-forming apparatus 100 according to a first exemplary embodiment. The image-forming apparatus 100 is a color laser printer including process cartridges P (PY, PM, PC, and PK) and an intermediate transfer belt 8. The process cartridges P form toner images of different colors and are arranged in parallel. The intermediate transfer belt 8 is an intermediate transfer member to which the toner images respectively formed on photosensitive drums 1 (1Y, 1M, 1C, and 1K) of the process cartridges P are to be transferred.

An image forming unit 30 superimposes the toner images of a plurality of colors, for example, four colors of yellow (Y), magenta (M), cyan (C), and black (K) to form a full color toner image on the intermediate transfer belt 8 (the intermediate transfer member) being rotatably moved. The image forming unit 30 includes the process cartridges P (PY, PM, PC, and PK) that are each attachable to and detachable from the image-forming apparatus 100 and form the toner images of yellow (Y), magenta (M), cyan (C), and black (K), respectively. The image forming unit 30 further includes an intermediate transfer belt unit 40 including the intermediate transfer belt 8 to which the toner images formed by the process cartridges P are to be transferred. The process cartridges P for the respective colors have the same configuration except that different colors of toners are stored in the process cartridges P. The letters "Y", "M", "C", and "K" at the ends of reference numerals of members of the process cartridges P indicate that the members correspond to the toner colors of yellow (Y), magenta (M), cyan (C), and black (K), respectively. Similarly, the letters "Y", "M", "C", and "K" at the ends of reference numerals of members other than the members of the process cartridges P indicate that the members correspond to the toner colors of yellow (Y), magenta (M), cyan (C), and black (K), respectively. Hereinafter, the letters "Y", "M", "C", and "K" at the ends of the reference numerals of the members are omitted unless a member of a particular process cartridge P is specified.

The process cartridges P (PY, PM, PC, and PK) include the photosensitive drums 1 (1Y, 1M, 1C, and 1K), charging rollers 2 (2Y, 2M, 2C, and 2K), and development rollers 3 (3Y, 3M, 3C, and 3K), respectively. Each of the photosensitive drums 1 is a rotatable image bearing member. Each of the charging rollers 2 charges the corresponding photosensitive drum 1 to a predetermined potential. Each of the development rollers 3 is a development member that attaches toner to an electrostatic latent image on the corresponding photosensitive drum 1 and forms a toner image thereon. The process cartridges P also include toner containers 23 (23Y, 23M, 23C, and 23K), drum cleaning blades 4 (4Y, 4M, 4C, and 4K), and waste toner containers 24 (24Y, 24M, 24C, and 24K), respectively. Each of the toner containers 23 stores the toner to be supplied to the corresponding development roller 3. Each of the drum cleaning blades 4 removes the toner on the corresponding photosensitive drum 1. Each of the waste toner containers 24 collects the toner removed by the corresponding drum cleaning blade 4. In FIG. 1, under the process cartridges P, laser units 7 (7Y, 7M, 7C, and 7K) corresponding thereto are provided. Each of the laser units 7 is an exposure unit that exposes the photosensitive drum 1 of the corresponding process cartridge P with laser light from a laser diode serving as a light source to form an electrostatic latent image corresponding to an image signal based on image information.

Each of the photosensitive drums 1 of the process cartridges P is rotatably driven at a predetermined circumferential speed in a direction (a clockwise direction) indicated by an arrow in FIG. 1. In the present exemplary embodiment, a case where a process speed in forming an image on plain paper is 300 mm per second (mm/s) will be described. In each of the process cartridges P, a predetermined charging voltage of negative polarity is applied from a corresponding one of charging voltage application units 60 (60Y, 60M, 60C, and 60K) to the charging roller 2 to charge the surface of the photosensitive drum 1 to a predetermined potential of negative polarity. After the charging process using the charging roller 2 is completed, the charged photosensitive drum 1 is scanned with the laser light from the laser unit 7, whereby an electrostatic latent image is formed on the photosensitive drum 1. A charging current passing through each of the charging rollers 2 is detected by a corresponding one of charging current detection units 61 (61Y, 61M, 61C, and 61K). The electrostatic latent image formed on each of the photosensitive drums 1 is reversely developed by application of a predetermined voltage of negative polarity from a voltage application unit (not illustrated) to the corresponding development roller 3. Then, the toner image (with negative polarity) of the color of the toner stored in the toner container 23 of the corresponding process cartridge P is formed on the photosensitive drum 1.

The intermediate transfer belt unit 40 includes the intermediate transfer belt 8, a drive roller 9, and a driven roller 10. The intermediate transfer belt 8 is flexible and endless. The drive roller 9 tightly stretches the intermediate transfer belt 8. Primary transfer rollers 6 (6Y, 6M, 6C, and 6K) are also arranged as transfer members inside the intermediate transfer belt 8 so that the primary transfer rollers 6 do not come into press contact with the photosensitive drums 1 via the intermediate transfer belt 8. Primary transfer voltage application circuits 62 (62Y, 62M, 62C, and 62K) and primary transfer current detection circuits 63 (63Y, 63M, 63C, and 63K) are connected to the primary transfer rollers 6 (6Y, 6M, 6C, and 6K), respectively. Each of the primary transfer voltage application circuits 62 is a transfer voltage application unit that applies a transfer voltage to the corresponding primary transfer roller 6. Each of the primary transfer current detection circuits 63 detects a current passing through the corresponding primary transfer roller 6.

In the present exemplary embodiment, primary transfer voltage control (auto transfer voltage control (ATVC)) is performed so that a stable and optimum primary transfer voltage corrected based on an environmental change and/or electric resistance unevenness of the intermediate transfer belt 8 is applied to the primary transfer rollers 6. ATVC is a method of determining a primary transfer voltage to be applied to the primary transfer rollers 6 in image formation. In a pre-rotation operation prior to the image formation, while a non-image portion of each of the photosensitive drums 1 on which the image formation is not to be performed passes through a primary transfer portion where the photosensitive drum 1 and the intermediate transfer belt 8 are in contact with each other, constant current control is performed on the voltage to be applied to the primary transfer rollers 6 using a preset value. Based on a change in voltage values generated at this time, a change in impedance at the primary transfer portion is detected. Then, during the image formation, constant voltage control is performed on the voltage to be applied to the primary transfer rollers 6 using a voltage value determined through calculation processing on the generated voltage values. In the calculation processing, the average of the generated voltage values is calculated, and the calculated average is multiplied by a predetermined coefficient. Such control enables the application of a suitable voltage during the image formation, thereby making it possible to stably output excellent images.

When the drive roller 9 is rotatably driven, the intermediate transfer belt 8 is rotated (moved) in a direction (an anti-clockwise direction) indicated by an arrow in FIG. 1 at a speed of 300 mm/s corresponding to the circumferential speed of the photosensitive drums 1. When a voltage of positive polarity is applied to the primary transfer rollers 6, the toner images with negative polarity that are formed on the photosensitive drums 1 of the process cartridges P are sequentially superimposed and transferred onto the intermediate transfer belt 8 at the primary transfer portions. More specifically, the toner images of four colors of yellow, magenta, cyan, and black are superimposed in this order and formed on the surface of the intermediate transfer belt 8. While the intermediate transfer belt 8 is rotated, the toner images on the intermediate transfer belt 8 are conveyed to a secondary transfer portion 18. The secondary transfer portion 18 is a contact portion where the intermediate transfer belt 8 and a secondary transfer roller 11 are in contact with each other.

A sheet feeding/conveying device 12 includes a transfer material cassette 13 for stacking and storing transfer materials (also referred to as sheets) S that are recording materials, a sheet feeding roller 14 for feeding the transfer materials S from the transfer material cassette 13, and a conveyance roller pair 15 for conveying the fed transfer materials S. A transfer material S conveyed from the sheet feeding/conveying device 12 at a speed of 300 mm/s corresponding to a rotation speed of the intermediate transfer belt 8 is conveyed to the secondary transfer portion 18 at predetermined control timing by a registration roller pair 16. At the secondary transfer portion 18, the transfer material S is nipped and conveyed by the intermediate transfer belt 8 and the secondary transfer roller 11. At this time, a voltage of positive polarity is applied to the secondary transfer roller 11. Consequently, the toner images formed on the intermediate transfer belt 8 are transferred to the transfer material S being nipped and conveyed at the secondary transfer portion 18.

The transfer material S to which the toner images are transferred from the intermediate transfer belt 8 is conveyed to a fixing device 17, which is a fixing unit. The fixing device 17 applies heat and pressure to the toner images transferred to the transfer material S (the recording material), thereby fixing the toner images to the transfer material S. The transfer material S to which the toner images are fixed by the fixing device 17 is discharged onto a discharge tray 50 by a discharge roller pair 20. A temperature sensor 430 serving as a temperature detection unit continuously detects an ambient temperature of the image-forming apparatus 100.

In each of the process cartridges P, the toner that is not transferred to the intermediate transfer belt 8 and remains on the surface of the photosensitive drum 1 is removed by the drum cleaning blade 4. Further, the toner that is not transferred from the intermediate transfer belt 8 to the transfer material S and remains on the surface of the intermediate transfer belt 8, and paper dust transferred from the transfer material S to the intermediate transfer belt 8 during the transfer to the transfer material S are removed by a cleaning blade 21, which is a cleaning member. The toner removed by the cleaning blade 21 is collected into a waste toner collection container 22.

[Calibration Function]

Some of image-forming apparatuses such as color laser printers have a calibration function of correcting image defects such as color shift and density deviation. More specifically, the calibration function includes the following operations. First, using an image density sensor 80, a detection operation of detecting the timing when the toner images transferred from the photosensitive drums 1 to the intermediate transfer belt 8 reach the position of the image density sensor 80, and detecting the density of the toner images transferred to the intermediate transfer belt 8 is performed. Next, a controller 450 (refer to FIG. 4) is notified of information about image writing timing calculated from the timing when the toner images transferred to the intermediate transfer belt 8 reach the position of the image density sensor 80, and information about a density correction amount based on the detected density of the toner images. The controller 450 changes the writing timing of the image to be formed and corrects the density based on the above information, thereby correcting color shift and density deviation. In a case where the calibration function is performed, as described below, color shift and density deviation are to be corrected based on the toner images formed in a situation where no abnormal discharge occurs at the primary transfer portions.

[Abnormal Discharge Occurrence Mechanism]

Figure 2:
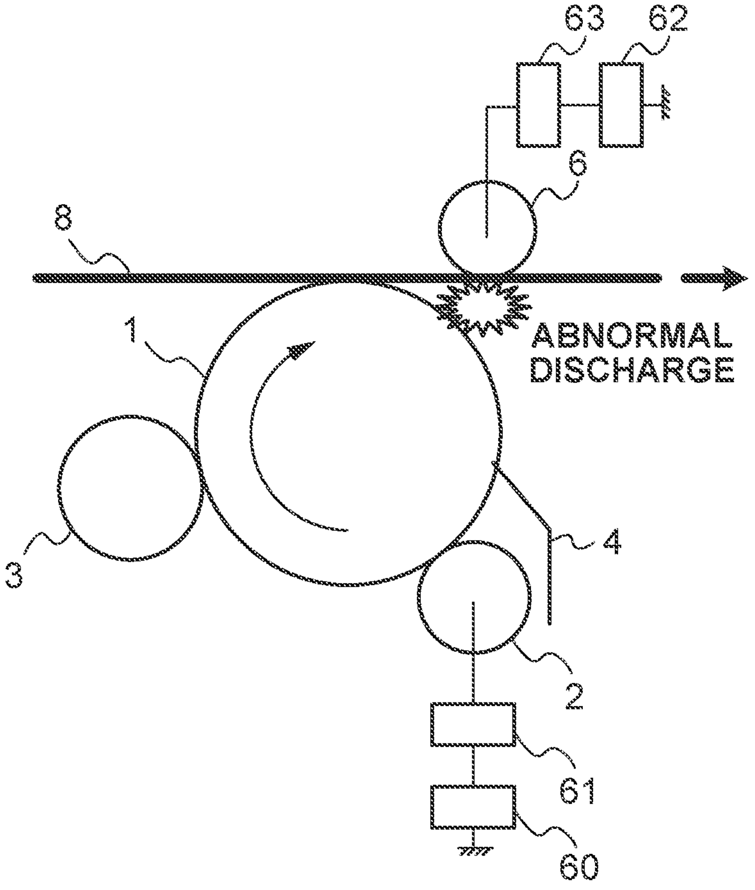
FIG. 2 is a view illustrating a mechanism of occurrence of an abnormal discharge according to the first to third exemplary embodiments.

FIG. 2 is an enlarged view of the primary transfer portion where the photosensitive drum 1 of each of the process cartridges P, the intermediate transfer belt 8, and the corresponding primary transfer roller 6 illustrated in FIG. 1 are in contact with each other. Abnormal discharge phenomena that are intended to be suppressed according to the present exemplary embodiment are discharge phenomena that occur between the primary transfer roller 6, which is a transfer member, and the photosensitive drum 1 in a case where there is a great difference in potential between the primary transfer roller 6 and the photosensitive drum 1.

In a case where the difference in potential between the primary transfer roller 6 and the photosensitive drum 1 is greater than or equal to a predetermined potential difference, the voltage applied to the primary transfer roller 6 causes charged electrons on the photosensitive drum 1 to be attracted all at once to the primary transfer roller 6. Consequently, potential of a region on the photosensitive drum 1 changes to a potential of positive polarity, and even after the region is charged by the charging roller 2, the potential changed to positive polarity cannot be changed to a potential of negative polarity, and the region is developed as a discharge mark by the development roller 3.

The intermediate transfer belt 8 contains an ion-conductive material, and in a low-temperature, low-humidity environment or in a case where the intermediate transfer belt 8 has reached the end of life, the resistance value of the intermediate transfer belt 8 is likely to be high. As illustrated in FIG. 2, in a configuration where the primary transfer roller 6 is located downstream of a position facing the photosensitive drum 1 in a movement direction of the intermediate transfer belt 8 so that the primary transfer roller 6 does not come into press contact with the photosensitive drum 1, the resistance value of the intermediate transfer belt 8 is substantially the impedance of the primary transfer portion. Thus, to transfer the toner images from the photosensitive drum 1 to the intermediate transfer belt 8, a high potential difference is needed between the primary transfer roller 6 and the photosensitive drum 1, and this is likely to cause an abnormal discharge.

[Suppression of Abnormal Discharge]

Figure 3:
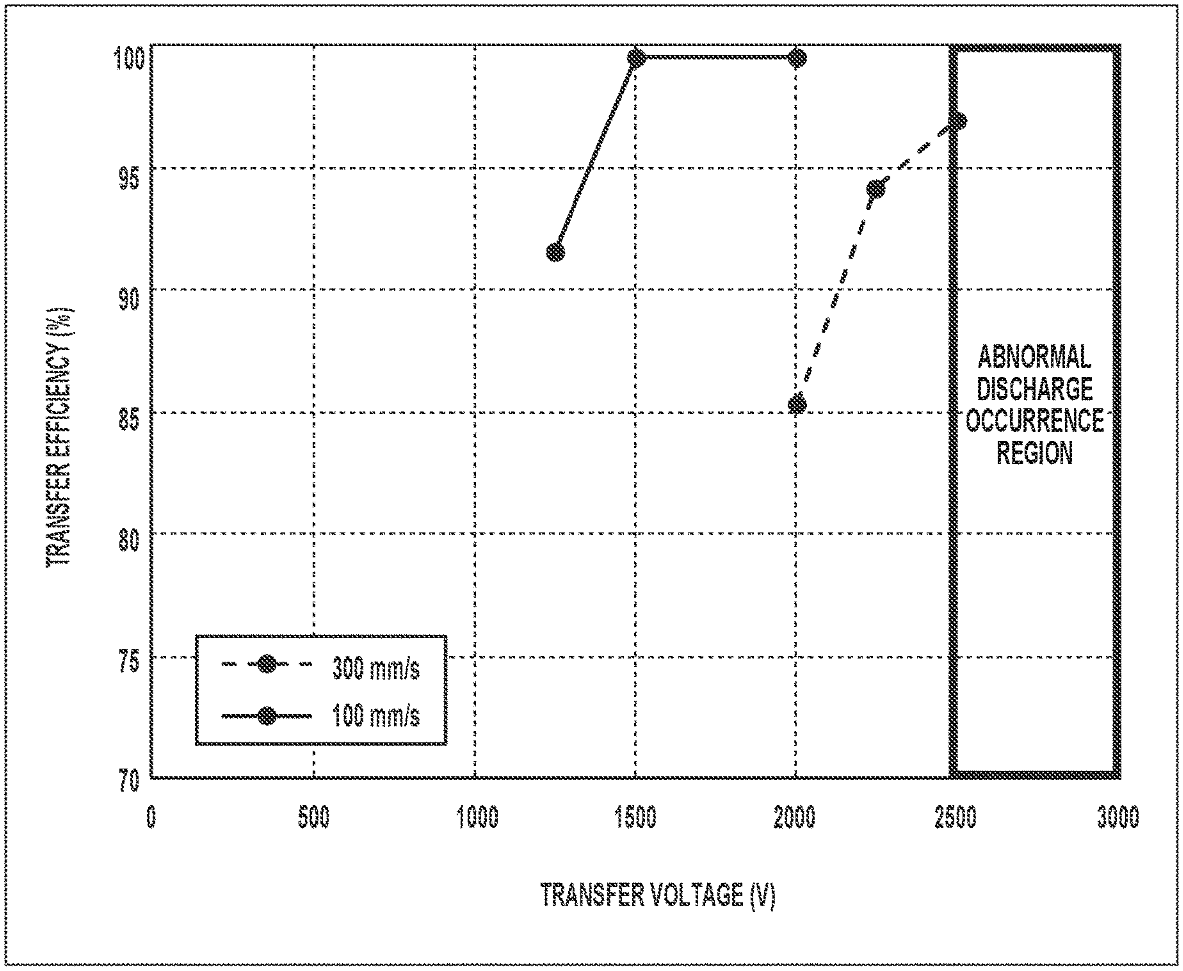
FIG. 3 is a diagram illustrating a relationship between transfer voltages and transfer efficiencies for each process speed at the time of calibration according to the first to third exemplary embodiments.

FIG. 3 is a diagram illustrating a relationship between transfer voltages and transfer efficiencies in cases where the process speed (the driving speed) at the time of calibration is set to a first speed (300 mm/s), which is a high speed mode, and to a second speed (100 mm/s), which is a low speed mode. In FIG. 3, a horizontal axis represents transfer voltages (unit: V), and a vertical axis represents transfer efficiencies (unit: %). In FIG. 3, a broken line indicates a graph showing a correspondence relationship between transfer voltages and transfer efficiencies in a case where the process speed is set to the first speed (300 mm/s), whereas a solid line indicates a graph showing a correspondence relationship between transfer voltages and transfer efficiencies in a case where the process speed is set to the second speed (100 mm/s). In FIG. 3, a region surrounded by a black frame indicates a region where an abnormal discharge with a transfer voltage of 2500 V to 3000 V occurs.

An advantage that is produced by changing the process speed at the time of calibration from the first speed (300 mm/s) to the second speed (100 mm/s) will now be described. In a case where the process speed at the time of calibration is set to the first speed (300 mm/s) and the transfer voltage is decreased to 2500 V or lower in order to suppress the occurrence of an abnormal discharge, the transfer efficiency decreases to about 96% or lower as illustrated in FIG. 3, which can cause density unevenness. In a situation where density unevenness occurs, the detection of the reaching timing of the toner images and the measurement of the density of the toner images using the image density sensor 80 may be performed inaccurately during calibration.

To address this, the process speed at the time of calibration is changed to the second speed (100 mm/s), whereby the transfer efficiency remains at about 99% even when the transfer voltage is 1500 V and the occurrence of an abnormal discharge can be suppressed, as illustrated in FIG. 3. As described above, changing the process speed to the second speed (100 mm/s) achieves a transfer efficiency of about 99%, and also reduces density unevenness compared to a case where the process speed is the first speed (300 mm/s) and the transfer efficiency is 96%. More specifically, performing the control to decrease the process speed at the time of calibration to the second speed (100 mm/s) to decrease the transfer voltage to be used suppresses the occurrence of an abnormal discharge without degrading image quality.

Image defects caused by an abnormal discharge phenomenon are basically limited in normal image forming operations in which an image with a low print ratio is to be printed, whereas image defects caused by an abnormal discharge phenomenon have a significant effect on calibration in a case where an image with a high print ratio is to be formed.

To address this, in the present exemplary embodiment, the process speed at the time of calibration is set to the second speed in a case where calibration is to be performed in a low temperature environment. This decreases the primary transfer voltage to be applied to the primary transfer roller 6. Consequently, highly accurate calibration results can be obtained while the occurrence of an abnormal discharge is suppressed.

[Hardware Configuration of Image-Forming Apparatus]

Figure 4:
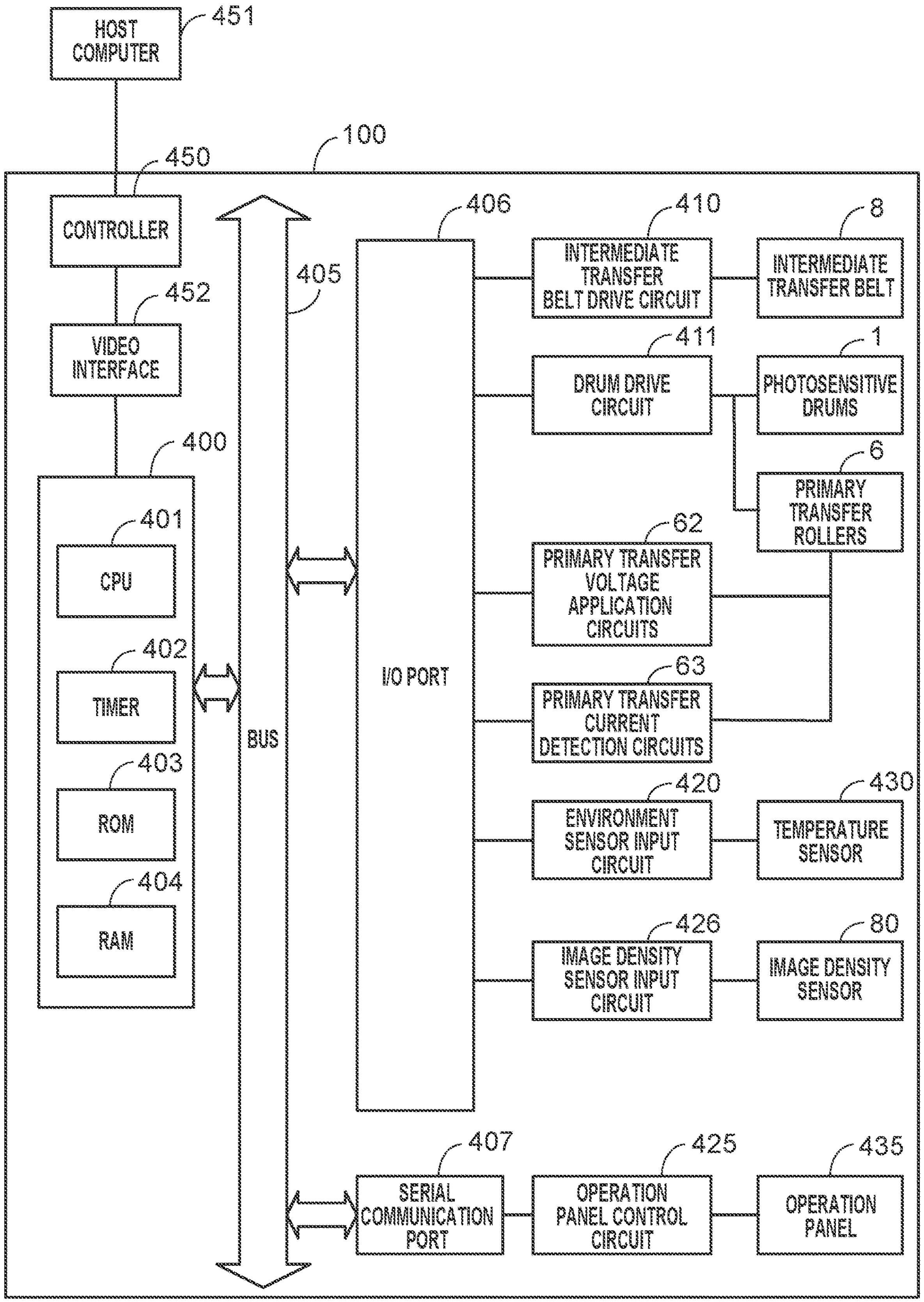
FIG. 4 is a diagram illustrating a system configuration of an image-forming apparatus according to the first to third exemplary embodiments.

FIG. 4 is a block diagram illustrating a configuration of hardware related to the toner image transfer at the primary transfer portions of the image-forming apparatus 100 according to the present exemplary embodiment. The hardware illustrated in FIG. 4 includes a host computer 451, and the controller 450, a control unit 400, and hardware related to the toner image transfer at the primary transfer portions in the image-forming apparatus 100. The host computer 451 is an external apparatus that issues a print request to the image-forming apparatus 100. The controller 450 is connected to the control unit 400 via a video interface 452 and is connected to the host computer 451 via a network or a printer cable. The control unit 400 includes a central processing unit (CPU) 401, a random access memory (RAM) 404, and a read-only memory (ROM) 403. The CPU 401 performs various control operations. The RAM 404 temporarily stores data for operations of the image-forming apparatus 100. The ROM 403 stores control programs, and control tables for operations of the image-forming apparatus 100. The control unit 400 also includes a timer 402 for generating timing signals for various types of control and for measuring time. The image-forming apparatus 100 further includes an input/output (I/O) port 406 and a serial communication port 407. The I/O port 406 inputs and outputs control signals to and from various units. The CPU 401, the RAM 404, the ROM 403, and the timer 402 of the control unit 400 are connected to the I/O port 406 and the serial communication port 407 via a bus 405 in the image-forming apparatus 100.

The controller 450 receives print data and print instructions transmitted from the host computer 451, and transmits the print data and the print instructions to the control unit 400 via the video interface 452. The control unit 400 controls the entire image-forming apparatus 100 and performs image forming operations based on the print instructions received from the controller 450.

An intermediate transfer belt drive circuit 410, a drum drive circuit 411, the primary transfer voltage application circuits 62, the primary transfer current detection circuits 63, an environment sensor input circuit 420, and an image density sensor input circuit 426 are also connected to the I/O port 406 of the image-forming apparatus 100. The intermediate transfer belt drive circuit 410 receives control signals from the CPU 401, and rotatably drives the intermediate transfer belt 8 and stops driving the intermediate transfer belt 8 based on the control signals. The drum drive circuit 411 rotatably drives the photosensitive drums 1 and the primary transfer rollers 6 and stops driving the photosensitive drums 1 and the primary transfer rollers 6 based on the control signals received from the CPU 401. The primary transfer voltage application circuits 62 apply a transfer voltage to the primary transfer rollers 6 to transfer the toner images formed on the photosensitive drums 1 to the intermediate transfer belt 8 based on the control signals from the CPU 401. At the primary transfer portions, the application of the transfer voltage from the primary transfer voltage application circuits 62 causes a current to pass through the photosensitive drums 1 via the primary transfer rollers 6 and the intermediate transfer belt 8. The primary transfer current detection circuits 63 detect a primary transfer current passing through the primary transfer rollers 6 and outputs the detected current values to the CPU 401. The environment sensor input circuit 420 outputs to the CPU 401 an outside temperature of the image-forming apparatus 100 detected by the temperature sensor 430. The image density sensor input circuit 426 outputs to the CPU 401 the density values of the toner images on the intermediate transfer belt 8 detected by the image density sensor 80 serving as an image density detection unit.

The serial communication port 407 is connected to an operation panel control circuit 425, and the operation panel control circuit 425 is connected to an operation panel 435. The operation panel 435 includes a liquid crystal panel for displaying information and instructions to a user and a keypad for inputting user instructions. The operation panel control circuit 425 displays information and instructions to the user on the liquid crystal panel of the operation panel 435 based on instructions from the CPU 401, and outputs to the CPU 401 the user instructions input via the keypad.

[Calibration Control Function Blocks of Image-Forming Apparatus]

Next, a function related to calibration control of the image-forming apparatus 100 will be described.

Figure 5:
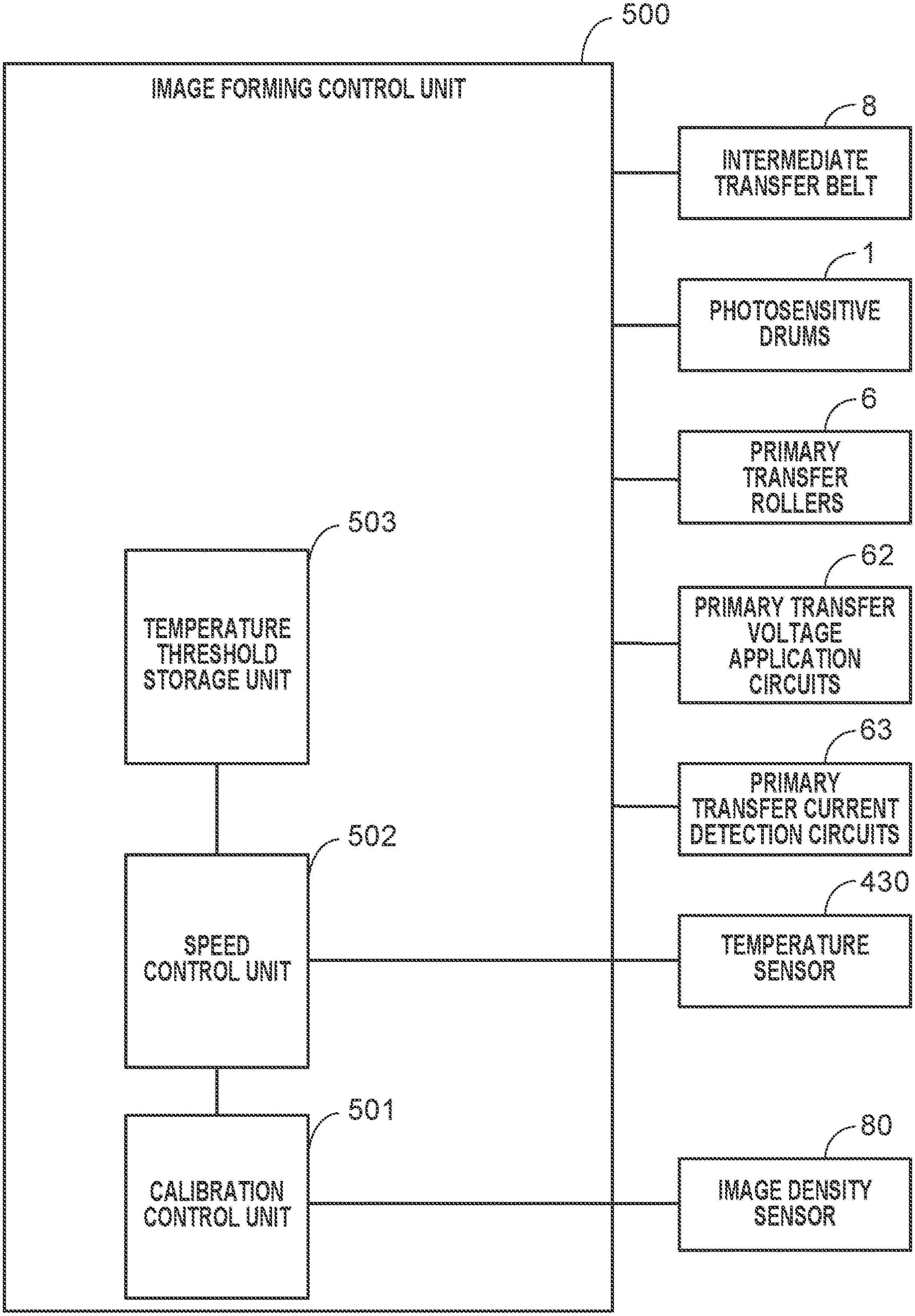
FIG. 5 is a control block diagram illustrating a configuration of a control unit of an image-forming apparatus according to the first exemplary embodiment.

FIG. 5 is a block diagram illustrating a relationship between function blocks related to the calibration control in an image forming control unit 500, and the hardware related to the toner image transfer at the primary transfer portions. The image forming control unit 500 performs a function related to image forming control among functions of the control unit 400 that controls the entire image-forming apparatus 100.

A calibration control function of the image forming control unit 500 is implemented by the CPU 401 executing a control program stored in the ROM 403. The image forming control unit 500 includes a calibration control unit 501, a speed control unit 502, and a temperature threshold storage unit 503 as function blocks related to the calibration control function.

Using the image density sensor 80, the calibration control unit 501 measures the timing when the toner images transferred from the photosensitive drums 1 to the intermediate transfer belt 8 reach the image density sensor 80 and the density of the toner images on the intermediate transfer belt 8, and calculates a color shift amount and a density correction amount. The calibration control unit 501 then transmits information about the calculated color shift amount and the calculated density correction amount to the controller 450. The controller 450 performs, for example, adjustment of the image writing timing and/or correction of the density values of the toner images based on the information acquired from the calibration control unit 501, thereby outputting toner images with the color shift and density corrected.

The speed control unit 502 controls the process speed to be set when the image forming control unit 500 performs calibration. The speed control unit 502 controls, for example, the driving speed of the intermediate transfer belt 8. The speed control unit 502 can also control the driving speed of the photosensitive drums 1 while controlling the driving speed of the intermediate transfer belt 8. As described above, in transferring the toner images from the photosensitive drums 1 to the intermediate transfer belt 8 during calibration, the higher the process speed is, the higher the primary transfer voltage to be applied from the primary transfer voltage application circuits 62 to the primary transfer rollers 6 is. More specifically, as the process speed increases, the resistance value between the photosensitive drums 1 and the intermediate transfer belt 8 increases and the transfer efficiency decreases, which causes an increase in the primary transfer voltage to be applied. Further, in a case where the image-forming apparatus 100 is in a low temperature environment, the resistance value between the photosensitive drums 1 and the intermediate transfer belt 8 increases even further, and thus the primary transfer voltage to be applied to the primary transfer rollers 6 becomes higher. As described above, the higher the primary transfer voltage to be applied to the primary transfer rollers 6 is, the higher the possibility of occurrence of an abnormal discharge is. If an abnormal discharge occurs, the toner images transferred from the photosensitive drums 1 to the intermediate transfer belt 8 do not have a desired density, and highly accurate calibration results are unable to be obtained.

To address this, the speed control unit 502 acquires a temperature detected by the temperature sensor 430 via the environment sensor input circuit 420, and sets the process speed at the time of calibration based on the acquired temperature (the temperature detected by the temperature sensor 430). More specifically, in a case where the speed control unit 502 determines that the image-forming apparatus 100 is in a low temperature environment lower than or equal to a predetermined temperature based on the temperature detected by the temperature sensor 430, the speed control unit 502 sets the process speed to the second speed, which is a low speed mode. In a case where the speed control unit 502 determines that the image-forming apparatus 100 is in a temperature environment higher than the predetermined temperature based on the temperature detected by the temperature sensor 430, the speed control unit 502 sets the process speed to the first speed, which is a high speed mode. The speed control unit 502 then notifies the image forming control unit 500 and the calibration control unit 501 of information about the set process speed. The speed control unit 502 controls the setting of the process speed based on the temperature environment of the image-forming apparatus 100, which makes it possible to perform calibration while suppressing the occurrence of an abnormal discharge and to obtain highly accurate calibration results.

The temperature threshold storage unit 503 stores a temperature threshold that is the predetermined temperature at which an abnormal discharge can occur. The speed control unit 502 acquires the temperature threshold from the temperature threshold storage unit 503 and determines whether the image-forming apparatus 100 is in a low temperature environment based on the acquired temperature threshold and the temperature detected by the temperature sensor 430. In a case where the temperature detected by the temperature sensor 430 is lower than or equal to the temperature threshold, the speed control unit 502 determines that the image-forming apparatus 100 is in a low temperature environment, and sets the process speed at the time of calibration to the second speed, which is a low speed mode.

[Process Speed Control by Speed Control Unit]

Figure 6:
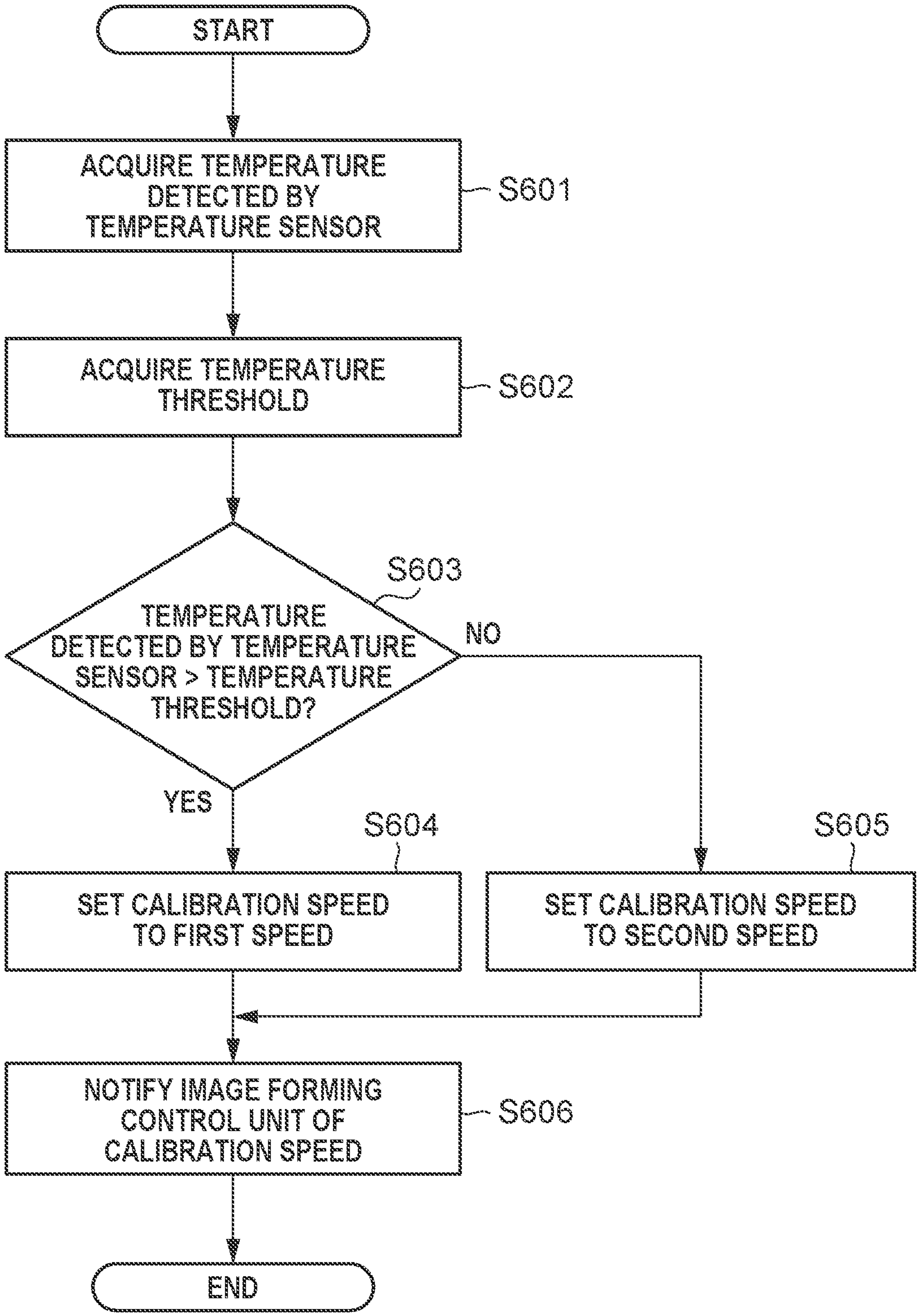
FIG. 6 is a flowchart illustrating a control sequence of a speed control unit according to the first exemplary embodiment.

FIG. 6 is a flowchart illustrating a sequence of controlling the process speed at the time of calibration according to the present exemplary embodiment. In a case where calibration is to be performed, the controller 450 transmits a calibration start instruction to the CPU 401 of the control unit 400 via the video interface 452. Upon receiving the calibration start instruction, the CPU 401 instructs the image forming control unit 500 to perform calibration. The processing illustrated in FIG. 6 is started in order to set the process speed at the time of calibration and is performed by the speed control unit 502 in a case where the image forming control unit 500 is to perform calibration.

In step S601, the speed control unit 502 acquires, via the environment sensor input circuit 420, the temperature detected by the temperature sensor 430. In step S602, the speed control unit 502 acquires, from the temperature threshold storage unit 503, the temperature threshold indicating that the image-forming apparatus 100 is currently in a low temperature environment. In the present exemplary embodiment, the temperature threshold stored in the temperature threshold storage unit 503 is, for example, a temperature value such as 7° C. The stored temperature threshold is such that in a case where the image-forming apparatus 100 is in a temperature environment lower than or equal to the temperature threshold, the resistance value of the intermediate transfer belt 8 is high and the abnormal discharge described above can occur.

In step S603, the speed control unit 502 determines whether the image-forming apparatus 100 is currently in a low temperature environment based on the temperature detected by the temperature sensor 430 and acquired in step S601, and the temperature threshold acquired in step S602 and indicating that the image-forming apparatus 100 is currently in a low temperature environment. In a case where the speed control unit 502 determines that the temperature detected by the temperature sensor 430 is higher than the temperature threshold and the image-forming apparatus 100 is not in a low temperature environment (YES in step S603), the processing proceeds to step S604. In a case where the speed control unit 502 determines that the temperature detected by the temperature sensor 430 is lower than or equal to the temperature threshold and the image-forming apparatus 100 is in a low temperature environment (NO in step S603), the processing proceeds to step S605.

In step S604, the speed control unit 502 sets the process speed at the time of calibration (hereinafter also referred to as the calibration speed or the calibration process speed) to the first speed, which is a high speed mode. In step S605, the speed control unit 502 sets the process speed at the time of calibration (the calibration speed) to the second speed, which is a low speed mode. In step S606, the speed control unit 502 notifies the image forming control unit 500 of the set calibration speed, and the processing ends.

The image forming control unit 500 and the calibration control unit 501 perform image forming operations based on the calibration process speed provided by the speed control unit 502. This suppresses the occurrence of an abnormal discharge between the primary transfer rollers 6 and the photosensitive drums 1, thereby making it possible to output toner images having a desired density.

The method of controlling the process speed at the time of calibration based on the temperature detected by the temperature sensor 430 has been described above. More specifically, in a case where the image-forming apparatus 100 is in a low temperature environment and an abnormal discharge can occur at the primary transfer portions, the process speed at the time of calibration is controlled to be the second speed, which is a low speed mode, thereby suppressing the occurrence of an abnormal discharge. As a result, calibration based on a desired toner image density can be performed.

While the control of two types of calibration process speeds, i.e., the first speed and the second speed has been described above in the present exemplary embodiment, the calibration process speeds are not limited to two types. For example, three or more types of calibration process speeds or two or more types of temperature thresholds can be prepared to set an optimum calibration process speed for each temperature environment.

As described above, the present exemplary embodiment makes it possible to reduce image defects caused by the occurrence of an abnormal discharge during calibration.

The control of changing the process speed at the time of calibration based on a determination of whether the image-forming apparatus 100 is in a low temperature environment based on a result of the detection by the temperature sensor 430 has been described in the first exemplary embodiment. In a case where the resistance value of the intermediate transfer belt 8 in manufacturing is small, an abnormal discharge is less likely to occur at the primary transfer portions even if the image-forming apparatus 100 is in a low temperature environment. Thus, in a second exemplary embodiment, control of the process speed at the time of calibration based on a result of the detection by the temperature sensor 430 and the resistance value of the intermediate transfer belt 8 will be described. An image-forming apparatus and members related to the calibration control according to the present exemplary embodiment are similar to those according to the first exemplary embodiment, and the same apparatus and members are given the same reference numerals to omit redundant descriptions thereof.

[Control Blocks of Image-Forming Apparatus]

Figure 7:
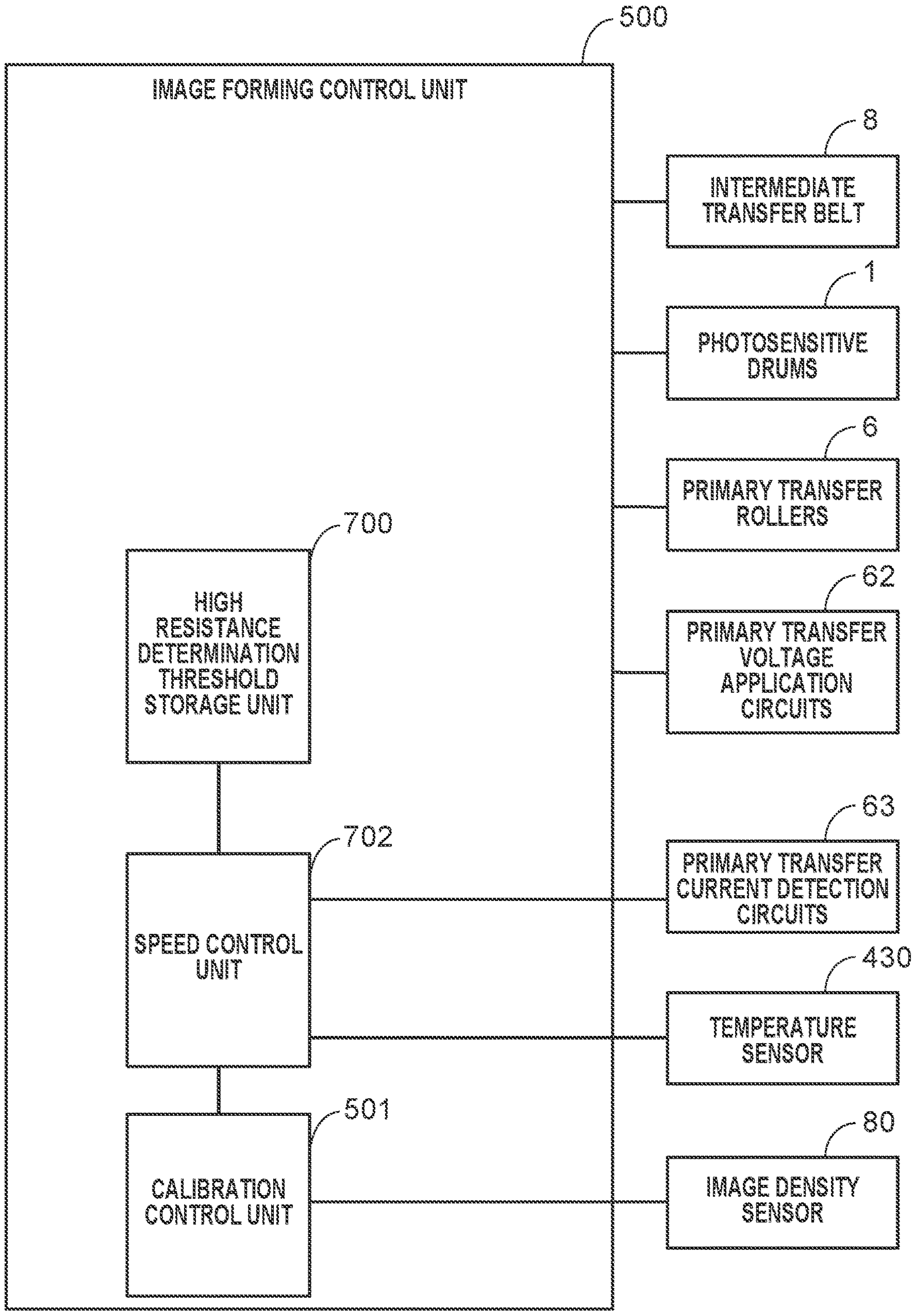
FIG. 7 is a control block diagram illustrating a configuration of a control unit of an image-forming apparatus according to the second exemplary embodiment.

A function of the image-forming apparatus 100 related to the calibration control according to the present exemplary embodiment will be described. FIG. 7 is a block diagram illustrating a relationship between function blocks related to the calibration control in the image forming control unit 500 that performs an image forming function, and the hardware related to the toner image transfer at the primary transfer portions. As illustrated in FIG. 7, the image forming control unit 500 according to the present exemplary embodiment includes the calibration control unit 501, a speed control unit 702, and a high resistance determination threshold storage unit 700 as function blocks related to the calibration control function.

Similarly to the first exemplary embodiment, using the image density sensor 80, the calibration control unit 501 measures the timing when the toner images transferred from the photosensitive drums 1 to the intermediate transfer belt 8 reach the image density sensor 80, and the density of the toner images on the intermediate transfer belt 8. The calibration control unit 501 then calculates a color shift amount and a density correction amount based on results of the measurement by the image density sensor 80 and transmits information about the calculated color shift amount and the calculated density correction amount to the controller 450. The controller 450 performs, for example, adjustment of the image writing timing and/or correction of the density values of the toner images based on the information acquired from the calibration control unit 501, thereby outputting toner images with the color shift and density corrected.

The high resistance determination threshold storage unit 700 stores a threshold for determining whether the resistance value of the intermediate transfer belt 8 is high. The speed control unit 702 acquires a temperature detected by the temperature sensor 430 via the environment sensor input circuit 420. The speed control unit 702 also calculates the resistance value of the intermediate transfer belt 8 based on the voltage applied to the primary transfer rollers 6 by the primary transfer voltage application circuits 62 and the value of the current passing through the primary transfer rollers 6 detected at this time by the primary transfer current detection circuits 63. The speed control unit 702 then acquires a high resistance determination threshold corresponding to the acquired temperature (the temperature detected by the temperature sensor 430) from the high resistance determination threshold storage unit 700, compares the calculated resistance value of the intermediate transfer belt 8 with the high resistance determination threshold, and determines the process speed. More specifically, in a case where the calculated resistance value of the intermediate transfer belt 8 is greater than the high resistance determination threshold, the speed control unit 702 determines that the resistance value of the intermediate transfer belt 8 is high, and sets the process speed to the second speed, which is a low speed mode. In a case where the calculated resistance value of the intermediate transfer belt 8 is less than or equal to the high resistance determination threshold, the speed control unit 702 determines that the resistance value of the intermediate transfer belt 8 is not high, and sets the process speed to the first speed, which is a high speed mode. The speed control unit 702 then notifies the image forming control unit 500 and the calibration control unit 501 of information about the set process speed.

[Process Speed Control by Speed Control Unit]

Figure 8:
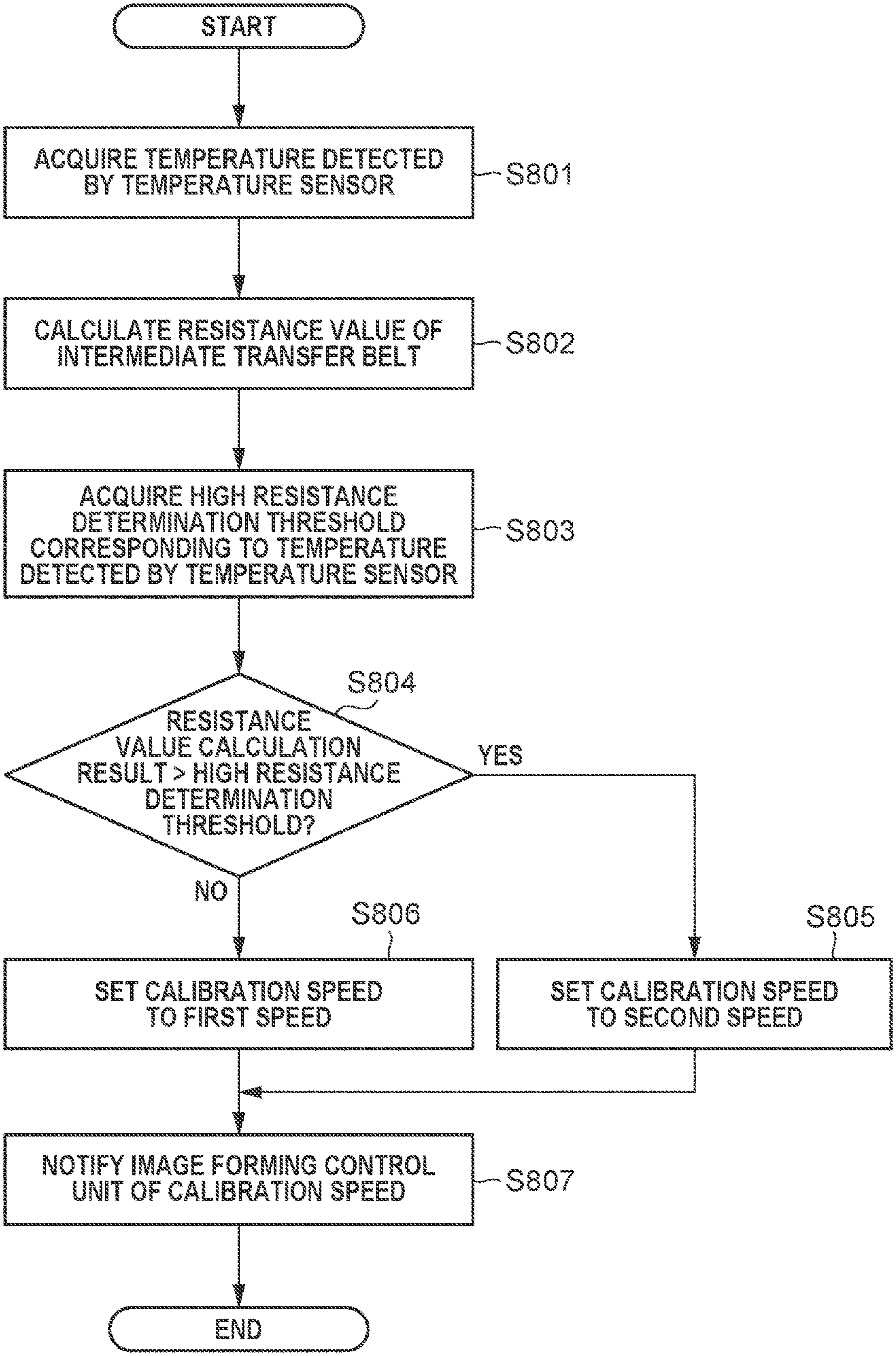
FIG. 8 is a flowchart illustrating a control sequence of a speed control unit according to the second exemplary embodiment.

FIG. 8 is a flowchart illustrating a sequence of controlling the process speed at the time of calibration according to the present exemplary embodiment. The processing illustrated in FIG. 8 is started in order to set the process speed at the time of calibration and is performed by the speed control unit 702 in a case where the image forming control unit 500 is to perform calibration.

Step S801 is similar in processing to step S601 in FIG. 6 according to the first exemplary embodiment, and a redundant description thereof will thus be omitted. In step S802, the speed control unit 702 acquires the voltage applied to the primary transfer rollers 6 by the primary transfer voltage application circuits 62 and the value of the current passing through the primary transfer rollers 6 detected by the primary transfer current detection circuits 63, and calculates the resistance value of the intermediate transfer belt 8. For example, in a case where the voltage applied to the primary transfer rollers 6 by the primary transfer voltage application circuits 62 is 3000 V and the value of the current passing through the primary transfer rollers 6 detected by the primary transfer current detection circuits 63 is 30 microamperes (μA), the resistance value of the intermediate transfer belt 8 is calculated to be $10000 \times 10^4$ ohms (Ω).

In step S803, the speed control unit 702 acquires a high resistance determination threshold corresponding to the temperature detected by the temperature sensor 430 and acquired in step S801 from the high resistance determination threshold storage unit 700. Table 1 indicates an example of high resistance determination thresholds corresponding to temperatures detected by the temperature sensor 430 and stored in the high resistance determination threshold storage unit 700. In Table 1, the left column shows temperatures detected by the temperature sensor 430 (unit: ° C.), and the right column shows thresholds (high resistance determination thresholds) (unit: Ω) that correspond to the temperatures detected by the temperature sensor 430 and are used to determine that the resistance value of the intermediate transfer belt 8 is high. In Table 1, for example, the high resistance determination threshold is $10000 \times 10^4$Ω in a case where the temperature detected by the temperature sensor 430 is 5° C., and the high resistance determination threshold is $10500 \times 10^4$Ω in a case where the temperature detected by the temperature sensor 430 is 30° C. As described above, the lower the temperature detected by the temperature sensor 430, the higher the resistance value of the intermediate transfer belt 8. Thus, in order for the speed control unit 702 to accurately determine that the resistance value of the intermediate transfer belt 8 is high based on the temperature detected by the temperature sensor 430, the high resistance determination thresholds are set in a stepwise manner in advance as illustrated in Table 1.

TABLE 1

| Temperature Detected by Temperature Sensor [° C.] | High Resistance Determination Threshold [Ω] |
|---|---|
| 5 | $10000 \times 10^4$ |
| 10 | $10100 \times 10^4$ |
| 15 | $10200 \times 10^4$ |
| 20 | $10300 \times 10^4$ |
| 25 | $10400 \times 10^4$ |
| 30 | $10500 \times 10^4$ |

In step S804, the speed control unit 702 compares the resistance value of the intermediate transfer belt 8 calculated in step S802 (the resistance value calculation result) with the high resistance determination threshold acquired from the high resistance determination threshold storage unit 700 in step S803. In a case where the calculated resistance value of the intermediate transfer belt 8 is greater than the high resistance determination threshold (YES in step S804), the speed control unit 702 determines that the resistance value of the intermediate transfer belt 8 is high, and the processing proceeds to step S805. In a case where the calculated resistance value of the intermediate transfer belt 8 is less than or equal to the high resistance determination threshold (NO in step S804), the speed control unit 702 determines that the resistance value of the intermediate transfer belt 8 is not high, and the processing proceeds to step S806. Steps S805, S806, and S807 are respectively similar in processing to steps S605, S604, and S606 in FIG. 6 according to the first exemplary embodiment, and redundant descriptions thereof will thus be omitted.

As described above, in the present exemplary embodiment, the setting of the process speed at the time of calibration is controlled based on the temperature environment of the image-forming apparatus 100 and the resistance value of the intermediate transfer belt 8. Thus, in a case where the resistance value of the intermediate transfer belt 8 is large, the process speed is set to the second speed, which is a low speed mode, thereby suppressing the occurrence of an abnormal discharge. In a case where the resistance value of the intermediate transfer belt 8 is small, the process speed is set to the first speed, which is a high speed mode, thereby shortening the time taken for calibration. This makes it possible to shorten unnecessary downtime for the user and improve usability.

As described above, the present exemplary embodiment makes it possible to reduce image defects caused by the occurrence of an abnormal discharge during calibration.

The control of changing the process speed at the time of calibration based on the result of the detection by the temperature sensor 430 and the resistance value of the intermediate transfer belt 8 has been described above in the second exemplary embodiment. It is known that the resistance value of the intermediate transfer belt 8 is generally high in a case where the intermediate transfer belt 8 has reached the end of life (its product life). Thus, in a third exemplary embodiment, control of the process speed at the time of calibration based on a result of detection by the temperature sensor 430 and a result of determining a life (a product life) of the intermediate transfer belt 8 will be described. An image-forming apparatus and members related to the calibration control according to the present exemplary embodiment are similar to those according to the first exemplary embodiment, and the same apparatus and members are given the same reference numerals to omit redundant descriptions thereof.

[Control Blocks of Image-Forming Apparatus]

Figure 9:
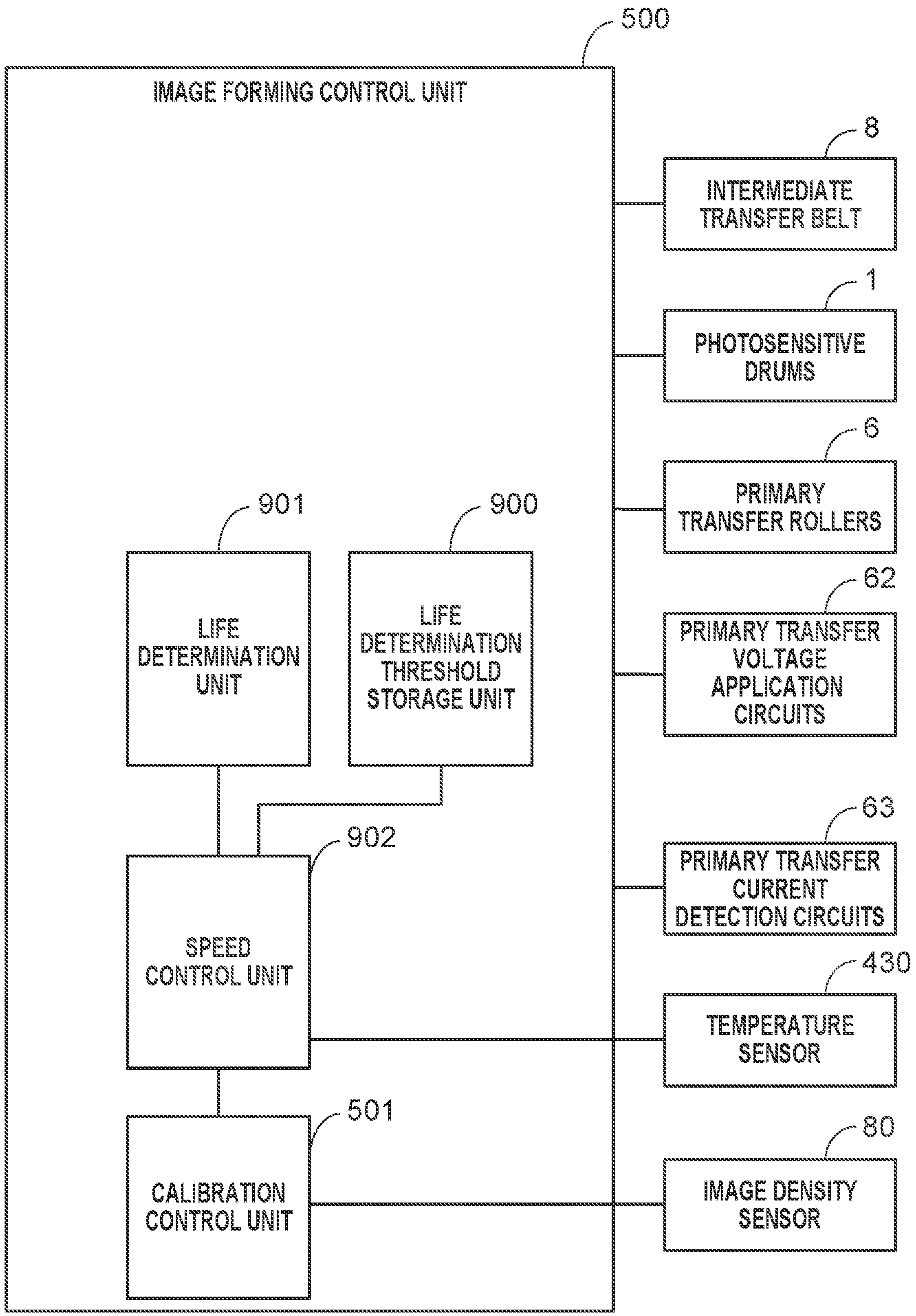
FIG. 9 is a control block diagram illustrating a configuration of a control unit of an image-forming apparatus according to the third exemplary embodiment.

A function of the image-forming apparatus 100 related to the calibration control according to the present exemplary embodiment will be described. FIG. 9 is a block diagram illustrating a relationship between function blocks related to the calibration control in the image forming control unit 500 that performs the image forming function, and the hardware related to the toner image transfer at the primary transfer portions. As illustrated in FIG. 9, the image forming control unit 500 according to the present exemplary embodiment includes the calibration control unit 501, a speed control unit 902, a life determination unit 901, and a life determination threshold storage unit 900 as function blocks related to the calibration control function.

The life determination threshold storage unit 900 stores thresholds for an indicator for use in determining the product life of the intermediate transfer belt 8. In the present exemplary embodiment, the life determination threshold storage unit 900 stores thresholds for the number of sheets subjected to printing in a case where the number of sheets of transfer materials S subjected to printing is used as an indicator in determining the product life of the intermediate transfer belt 8.

The life determination unit 901 determines the product life of the intermediate transfer belt 8. In the present exemplary embodiment, the product life of the intermediate transfer belt 8 is determined based on the number of sheets of transfer materials S subjected to printing by the image-forming apparatus 100 after the start of use of the intermediate transfer belt 8 that is currently in use. The product life determination is not limited to the number of sheets of transfer materials S subjected to printing, and can be made based on, for example, the running distance of the intermediate transfer belt 8 or the number of rotations of the drive roller 9 configured to drive the intermediate transfer belt 8. In the present exemplary embodiment, each time printing is performed on a transfer material S, the life determination unit 901 counts up the number of sheets subjected to printing. The life determination unit 901 compares the number of sheets of transfer materials S subjected to printing that is counted by the life determination unit 901 with a threshold for the number of sheets of transfer materials S subjected to printing that is stored in the life determination threshold storage unit 900, and determines whether the intermediate transfer belt 8 has reached the end of life. The speed control unit 902 controls the process speed at the time of calibration based on a result of the detection by the temperature sensor 430 and a result of the determination by the life determination unit 901.

[Control by Speed Control Unit]

Figure 10:
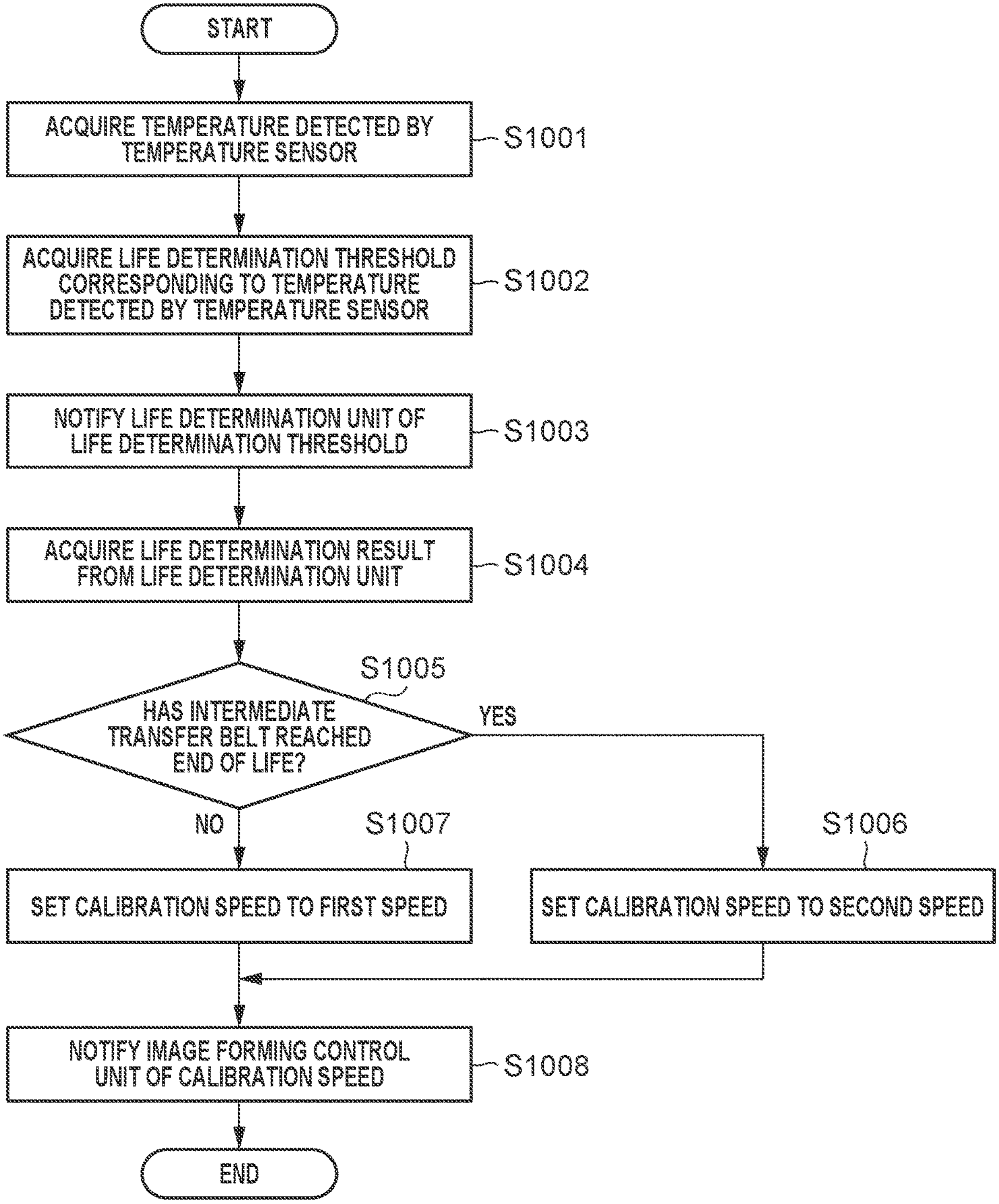
FIG. 10 is a flowchart illustrating a control sequence of a speed control unit according to the third exemplary embodiment.

FIG. 10 is a flowchart illustrating a sequence of controlling the process speed at the time of calibration according to the present exemplary embodiment. The processing illustrated in FIG. 10 is started in order to set the process speed at the time of calibration and is performed by the speed control unit 902 in a case where the image forming control unit 500 is to perform calibration.

Step S1001 is similar in processing to step S601 in FIG. 6 according to the first exemplary embodiment, and a redundant description thereof will thus be omitted. In step S1002, the speed control unit 902 acquires, from the life determination threshold storage unit 900, a threshold for the number of sheets of transfer materials S subjected to printing, which is a life determination threshold corresponding to the temperature detected by the temperature sensor 430 and acquired in step S1001. Table 2 indicates an example of thresholds for the number of sheets of transfer materials S subjected to printing, which are stored in the life determination threshold storage unit 900 and are life determination thresholds corresponding to temperatures detected by the temperature sensor 430. In Table 2, the left column shows temperatures detected by the temperature sensor 430 (unit: ° C.), and the right column shows life determination thresholds (numbers of sheets of transfer materials S subjected to printing) (unit: pieces) that correspond to the temperatures detected by the temperature sensor 430 and are used to determine that the intermediate transfer belt 8 has reached the end of life. In Table 2, for example, the life determination threshold (the number of sheets subjected to printing) is 150,000 in a case where the temperature detected by the temperature sensor 430 is 5° C., and the life determination threshold (the number of sheets subjected to printing) is 155,000 in a case where the temperature detected by the temperature sensor 430 is 30° C. In order for the speed control unit 902 to accurately determine the life of the intermediate transfer belt 8 based on the temperature detected by the temperature sensor 430, the life determination thresholds are set in a stepwise manner in advance as illustrated in Table 2.

TABLE 2

| Temperature Detected by Temperature Sensor [° C.] | Life Determination Threshold (Number of Sheets Subjected to Printing) [Pieces] |
|---|---|
| 5 | 150,000 |
| 10 | 151,000 |
| 15 | 152,000 |
| 20 | 153,000 |
| 25 | 154,000 |
| 30 | 155,000 |

In step S1003, the speed control unit 902 notifies the life determination unit 901 of the life determination threshold acquired in step S1002. The life determination unit 901 compares the number of sheets subjected to printing, which is counted by the life determination unit 901 each time printing is performed on a transfer material S, with the life determination threshold (the number of sheets subjected to printing) provided by the speed control unit 902, and determines the product life of the intermediate transfer belt 8. In a case where the counted number of sheets of transfer materials S subjected to printing is greater than the life determination threshold provided by the speed control unit 902, the life determination unit 901 determines that the intermediate transfer belt 8 has reached the end of life. In a case where the counted number of sheets of transfer materials S subjected to printing is less than or equal to the life determination threshold provided by the speed control unit 902, the life determination unit 901 determines that the intermediate transfer belt 8 has not reached the end of life. The life determination unit 901 then notifies the speed control unit 902 of the result of determining the product life of the intermediate transfer belt 8.

In step S1004, the speed control unit 902 acquires the result of determining the life of the intermediate transfer belt 8 from the life determination unit 901. In step S1005, the speed control unit 902 determines whether the intermediate transfer belt 8 has reached the end of life based on the life determination result acquired from the life determination unit 901. In a case where the speed control unit 902 determines that the intermediate transfer belt 8 has reached the end of life (YES in step S1005), the processing proceeds to step S1006. In a case where the speed control unit 902 determines that the intermediate transfer belt 8 has not reached the end of life (NO in step S1005), the processing proceeds to step S1007. Steps S1006, S1007, and S1008 are respectively similar in processing to steps S605, S604, and S606 in FIG. 6 according to the first exemplary embodiment, and redundant descriptions thereof will thus be omitted.

As described above, according to the present exemplary embodiment, the setting of the process speed at the time of calibration is controlled based on the temperature environment of the image-forming apparatus 100 and the life of the intermediate transfer belt 8. In a case where the intermediate transfer belt 8 has reached the end of life, the process speed is set to the second speed, which is a low speed mode, thereby suppressing the occurrence of an abnormal discharge. In a case where the intermediate transfer belt 8 has not reached the end of life, the process speed is set to the first speed, which is a high speed mode, thereby shortening the time taken for calibration. This makes it possible to shorten unnecessary downtime for the user and improve usability.

As described above, the present exemplary embodiment makes it possible to reduce image defects caused by the occurrence of an abnormal discharge during calibration.

The method considering the resistance value of the intermediate transfer belt 8 according to the second exemplary embodiment is applicable in addition to the third exemplary embodiment.

The exemplary embodiments of the present disclosure make it possible to reduce image defects caused by the occurrence of an abnormal discharge during calibration.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-063360, filed Apr. 6, 2022, which is hereby incorporated by reference herein in its entirety.

What is claimed is:

1. An image-forming apparatus to form an image on a recording material, the image-forming apparatus comprising:

a photosensitive drum configured to rotate;

an exposure unit including a light source and configured to expose the photosensitive drum with light from the light source and form an electrostatic latent imageon a surface of the photosensitive drum;

a development member configured to develop the electrostatic latent image formed on the photosensitive drum with toner and form a toner image on the surface of the photosensitive drum;

an intermediate transfer belt to which the toner image formed on the photosensitive drum is to be transferred;

a transfer member configured to transfer the toner image to the intermediate transfer belt;

a transfer voltage application unit configured to apply a transfer voltage to the transfer member;

a density detection unit configured to detect an information related to a density of the toner image transferred to the intermediate transfer belt;

a temperature detection unit configured to detect an ambient temperature; and a control unit configured to control a driving speed of the intermediate transfer belt, wherein the intermediate transfer belt has a first resistance value in a case where the ambient temperature is a first temperature, and has a second resistance value greater than the first resistance value in a case where the ambient temperature is a second temperature lower than the first temperature and a predetermined threshold is the first temperature, wherein, in a detection operation in which the density detection unit detects the information related to the density of the toner image transferred to the intermediate transfer belt in a state where the transfer voltage is applied to the transfer member, the control unit controls the driving speed based on the ambient temperature detected by the temperature detection unit, and wherein the control unit performs control to set the driving speed to a first speed in a case where the ambient temperature detected by the temperature detection unit is higher than the predetermined threshold for the ambient temperature, and performs control to set the driving speed to a second speed slower than the first speed in a case where the ambient temperature detected by the temperature detection unit is lower than or equal to the predetermined threshold.

2. The image-forming apparatus according to claim 1, further comprising a current detection unit configured to detect a current passing through the transfer member, wherein, in the detection operation, the control unit controls the driving speed based on the ambient temperature detected by the temperature detection unit and a resistance value of the intermediate transfer belt that is calculated based on a value of the current detected by the current detection unit and the transfer voltage applied to the transfer member.

3. The image-forming apparatus according to claim 2, further comprising a storage unit configured to store information about a threshold for the resistance value of the intermediate transfer belt where the threshold corresponds to the ambient temperature, wherein the control unit performs control to acquire, from the storage unit, the threshold corresponding to the ambient temperature detected by the temperature detection unit.

4. The image-forming apparatus according to claim 3, wherein the control unit performs control to set the driving speed to the second speed in a case where the calculated resistance value of the intermediate transfer belt is greater than the threshold, and performs control to set the driving speed to the first speed faster than the second speed in a case where the calculated resistance value of the intermediate transfer belt is less than or equal to the threshold.

5. The image-forming apparatus according to claim 1, further comprising a life determination unit configured to measure an indicator for determining a life of the intermediate transfer belt and determine that the intermediate transfer belt has reached end of the life based on a result of measuring the indicator, wherein, in the detection operation, the control unit controls the driving speed based on the ambient temperature detected by the temperature detection unit and a result of the determination by the life determination unit.

6. The image-forming apparatus according to claim 5, further comprising a storage unit configured to store information about a threshold for the indicator that corresponds to the ambient temperature, wherein the control unit performs control to acquire, from the storage unit, the threshold for the indicator that corresponds to the ambient temperature detected by the temperature detection unit.

7. The image-forming apparatus according to claim 6, wherein the life determination unit determines that the intermediate transfer belt has reached the end of the life in a case where the result of measuring the indicator is greater than the threshold for the indicator acquired by the control unit, and determines that the intermediate transfer belt has not reached the end of the life in a case where the result of measuring the indicator is less than or equal to the threshold for the indicator.

8. The image-forming apparatus according to claim 7, wherein the control unit performs control to set the driving speed to the second speed in a case where the life determination unit determines that the intermediate transfer belt has reached the end of the life, and performs control to set the driving speed to the first speed faster than the second speed in a case where the life determination unit determines that the intermediate transfer belt has not reached the end of the life.

9. The image-forming apparatus according to claim 8, wherein the indicator is a number of sheets of recording materials subjected to printing after start of use of the intermediate transfer belt.

10. The image-forming apparatus according to claim 1, wherein the transfer member is located downstream of the photosensitive drum in a movement direction of the intermediate transfer belt.

11. The image-forming apparatus according to claim 1, wherein the control unit controls the driving speed of the intermediate transfer belt and a driving speed of the photosensitive drum.

* * * * *